US005227776A

United States Patent [19]

Starefoss

[11] Patent Number: 5,227,776

[45] Date of Patent: Jul. 13, 1993

[54] COMBINED ALARM, SECURITY AND RESCUE SYSTEM

[76] Inventor: Carl E. Starefoss, Eidsvagveien 104 N-5080, Eidsvag, Norway

[21] Appl. No.: 592,692

[22] Filed: Oct. 3, 1990

Related U.S. Application Data

[63] Continuation-in-part of Ser. No. 267,119, Oct. 26, 1988, abandoned.

[30] Foreign Application Priority Data

Mar. 18, 1987 [NO] Norway ................................ 871097

[51] Int. Cl.[5] ................................................ H04Q 1/00

[52] U.S. Cl. ................................ 340/825.36; 340/287; 340/332; 340/506; 340/568; 340/628; 340/825.06; 340/825.55

[58] Field of Search ............... 340/506, 531, 533, 539, 340/568, 500, 628, 332, 333, 825.36, 825.06, 825.15, 825.08, 825.37, 825.54, 825.55, 286.07-286.08, 287-290, 305

[56] References Cited

U.S. PATENT DOCUMENTS

| | | | |
|---|---|---|---|
| 3,145,375 | 8/1964 | Webb | 340/280 |
| 3,925,763 | 12/1975 | Wadhwani et al. | 340/825.36 |
| 4,015,250 | 3/1977 | Fudge | 340/568 |
| 4,361,832 | 11/1982 | Cole | 340/505 |
| 4,375,637 | 3/1983 | Desjardins | 340/505 |
| 4,531,114 | 7/1985 | Topol et al. | 340/539 |
| 4,617,561 | 12/1986 | Brown | 340/628 |
| 4,665,383 | 3/1987 | Desjardins | 340/506 |
| 4,673,920 | 6/1987 | Ferguson et al. | 340/521 |

FOREIGN PATENT DOCUMENTS

| | | | |
|---|---|---|---|
| 951544 | 7/1981 | Fed. Rep. of Germany | 340/286.08 |
| 3237279 | 4/1984 | Fed. Rep. of Germany . | |
| 3405745 | 8/1985 | Fed. Rep. of Germany . | |

*Primary Examiner*—Donald J. Yusko
*Assistant Examiner*—Brian Zimmerman
*Attorney, Agent, or Firm*—Francis C. Hand

[57] ABSTRACT

A combined alarm, security and rescue system includes room boxes (33*a*-33*j*, 35*a*-35*j*) in associated rooms, a two way communication system (29*a*-29C, 30*a*-30C, 31*a*-31*b*, 32*a*-32*j*, 34*a*-34*j*) between a number of room boxes and a central operator station, and a central operator station. The system can be used in hotels, hospitals, cruise vessels, offshore living quarter platforms, and other places where many people usually are gathered within a definite area. In case of an emergency situation, the system provides essential information at the operator station for rescue crew, and thus acts as a decision tool for the rescue leader. The system also provides personal safety equipment like breathing masks (contained in the room boxes), that can be used by the people in the rooms in order to break through areas filled with smoke. Further, necessary equipment for a person-to-person communication between the central operator and the people present in the actual rooms is provided. The communication system enables the central operator to give alarms and other messages to persons in one or more rooms, and to receive acknowledgements from the persons in the room(s).-Finally, all events are time-stamped and recorded at the central operator station, so that investigators easily can reconstruct the progress of a disaster.

12 Claims, 9 Drawing Sheets

FIG. 2 INPUT INTERFACE CARD
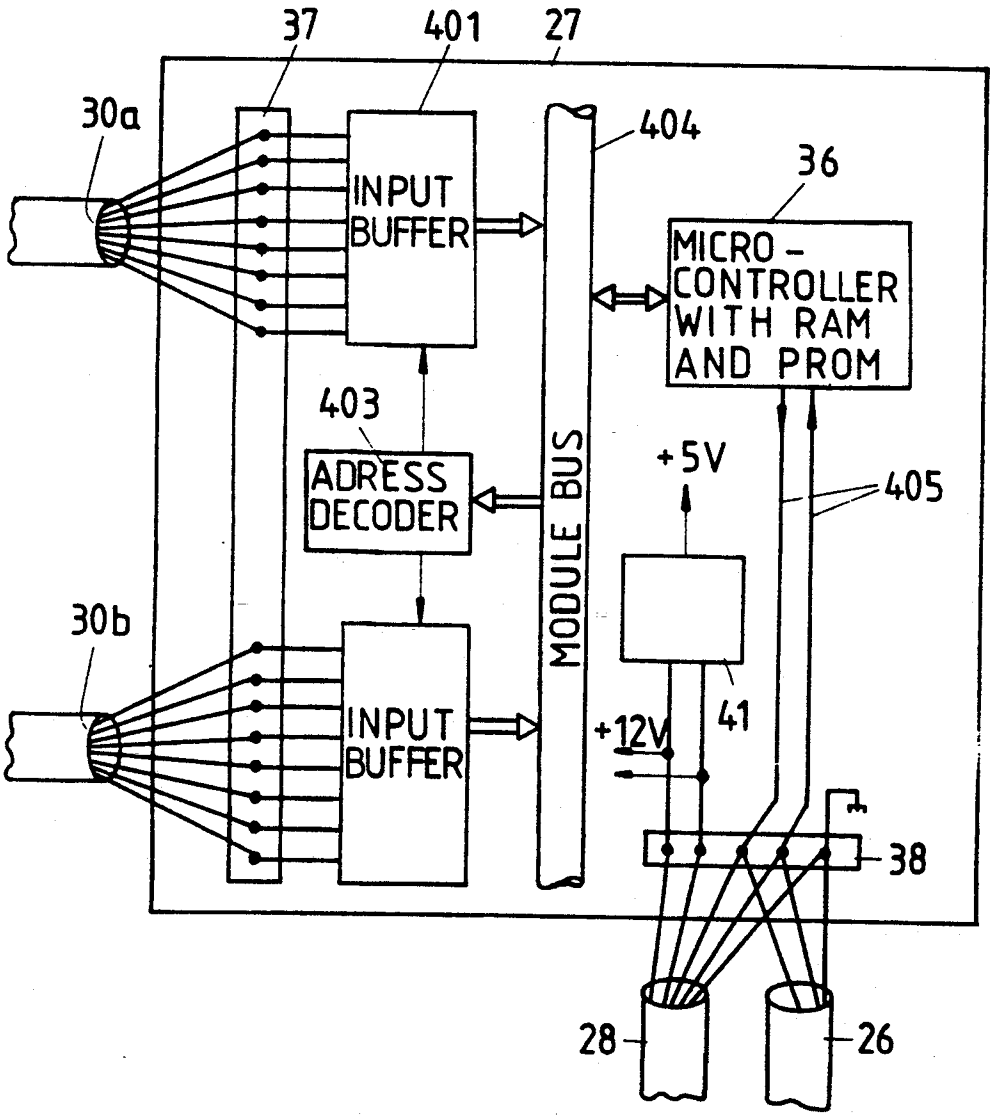

FIG. 3 OUTPUT INTERFACE CARD
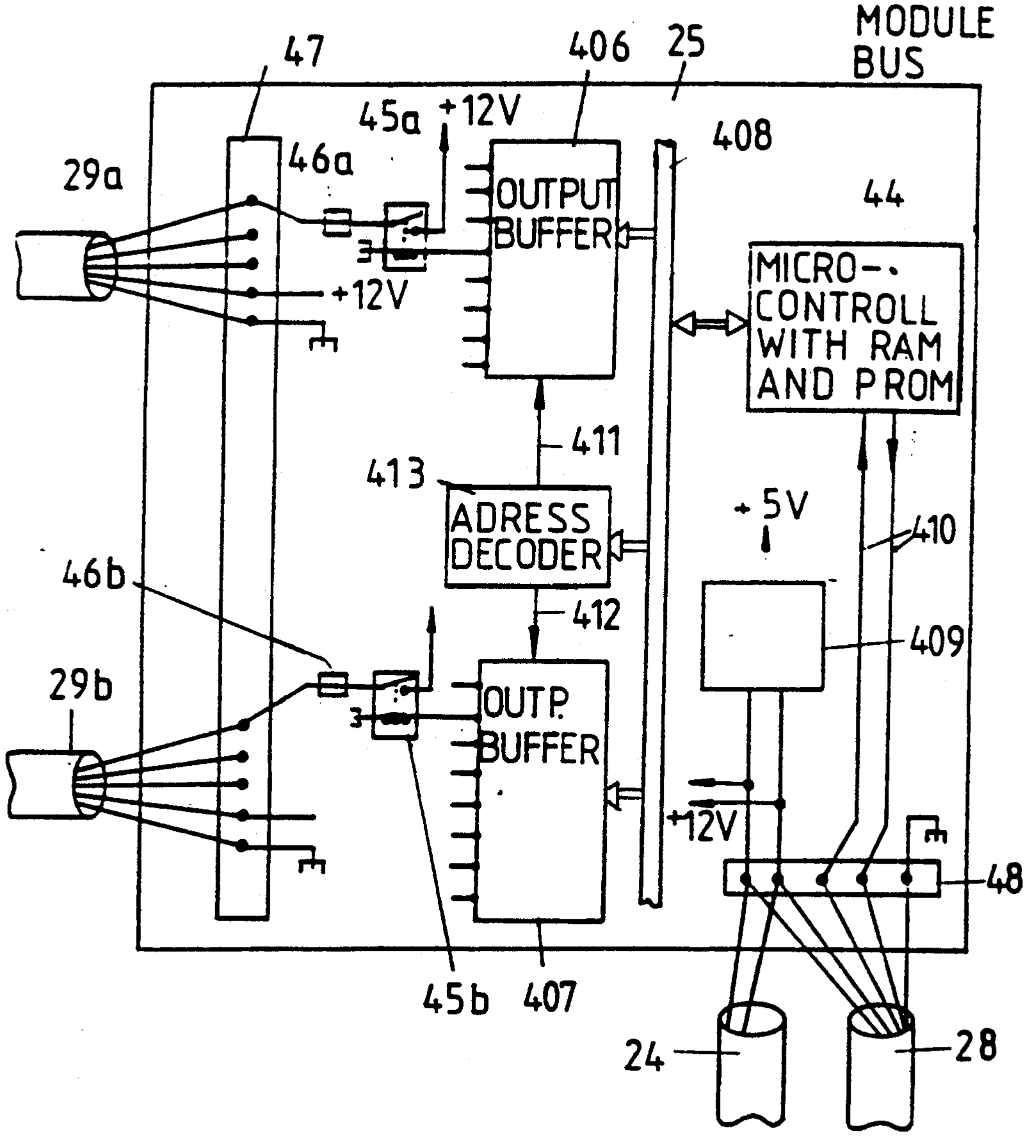

FIG. 4 JUNCTION BOX
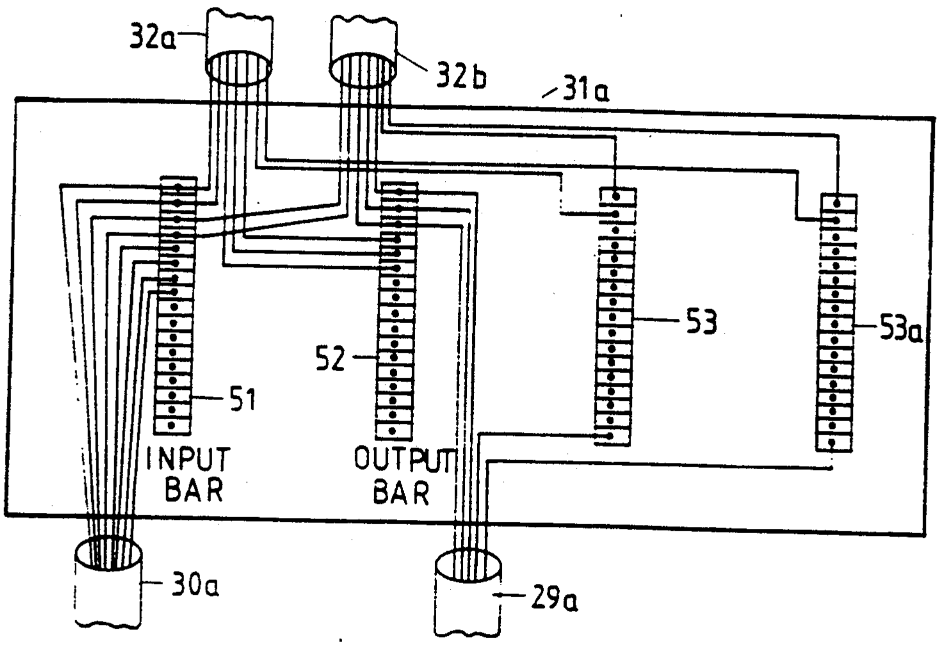
FIG. 4a
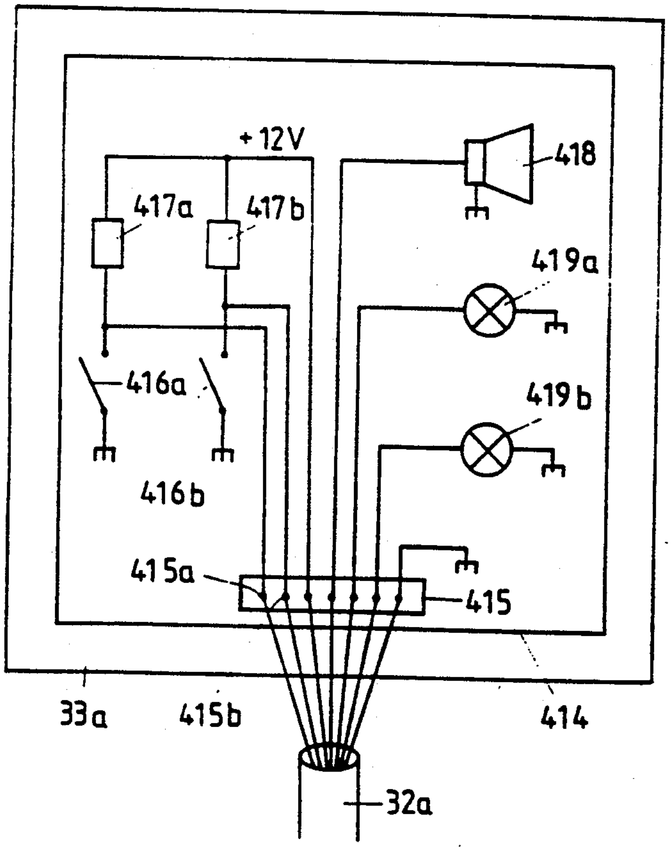

FIG. 12 EMBODIMENT WITH BROADBAND CABLE
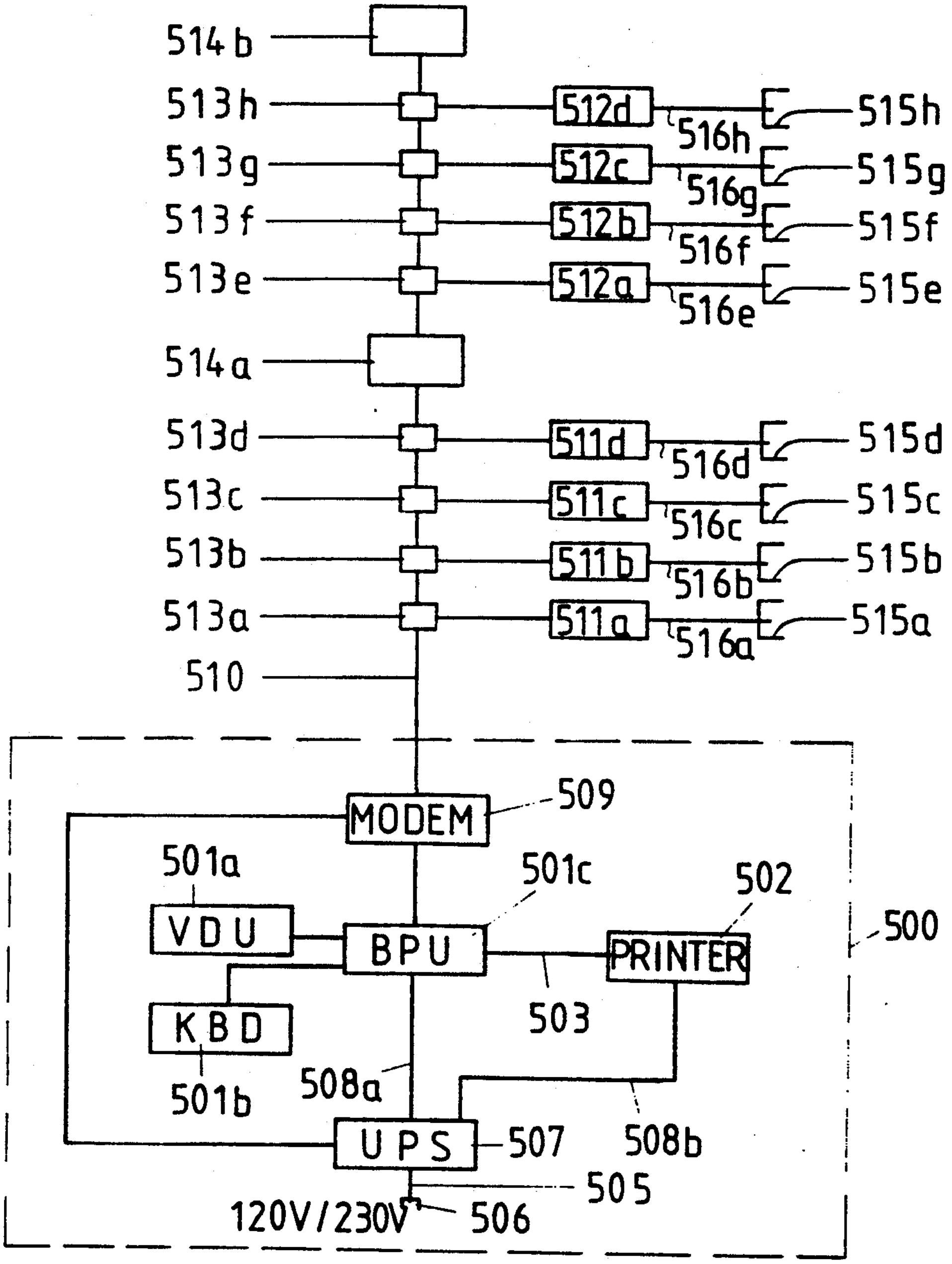

FIG.13 INTELLIGENT ROOM BOX
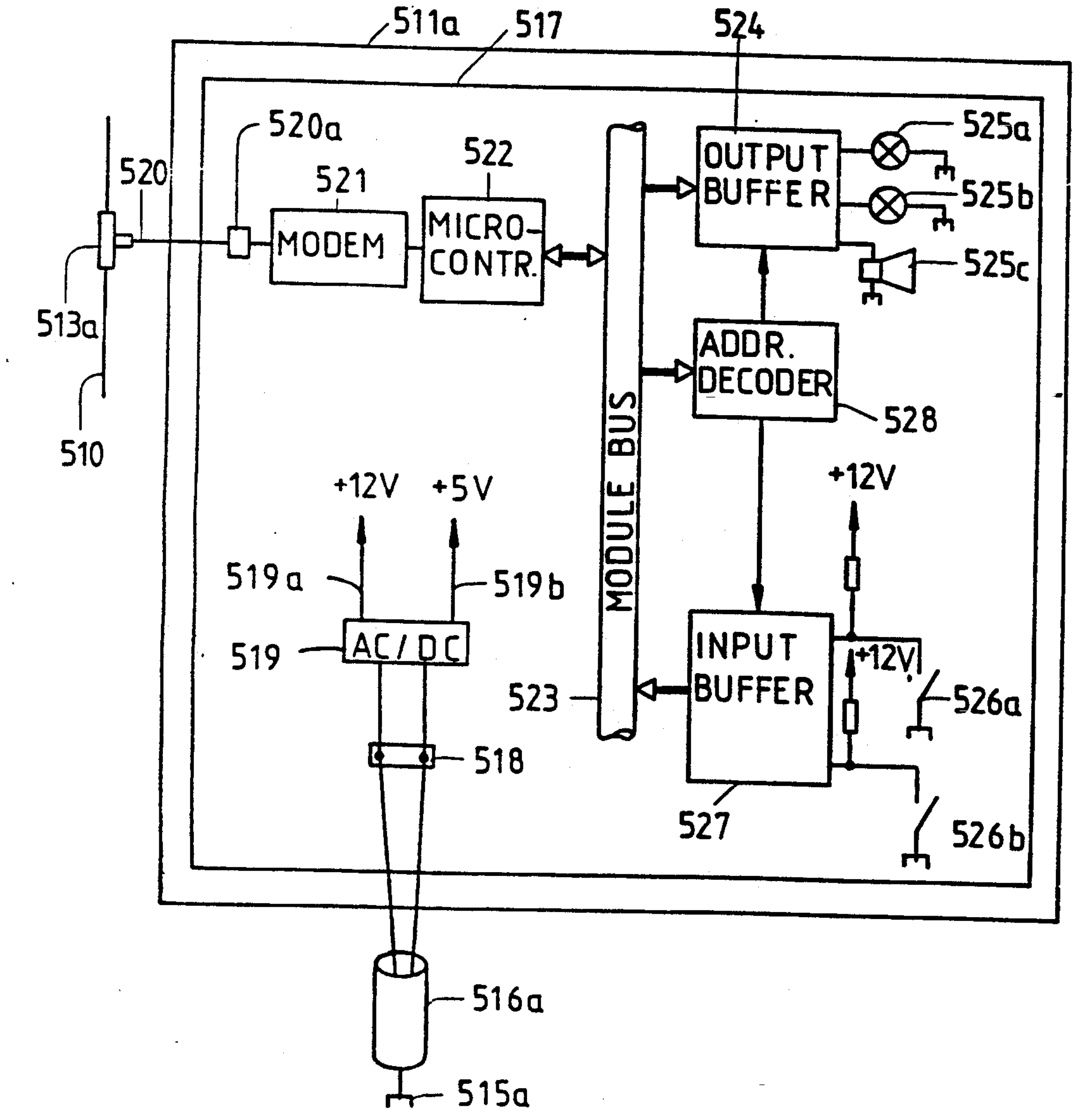

FIG. 14 SOFTWARE FLOW DIAGRAM
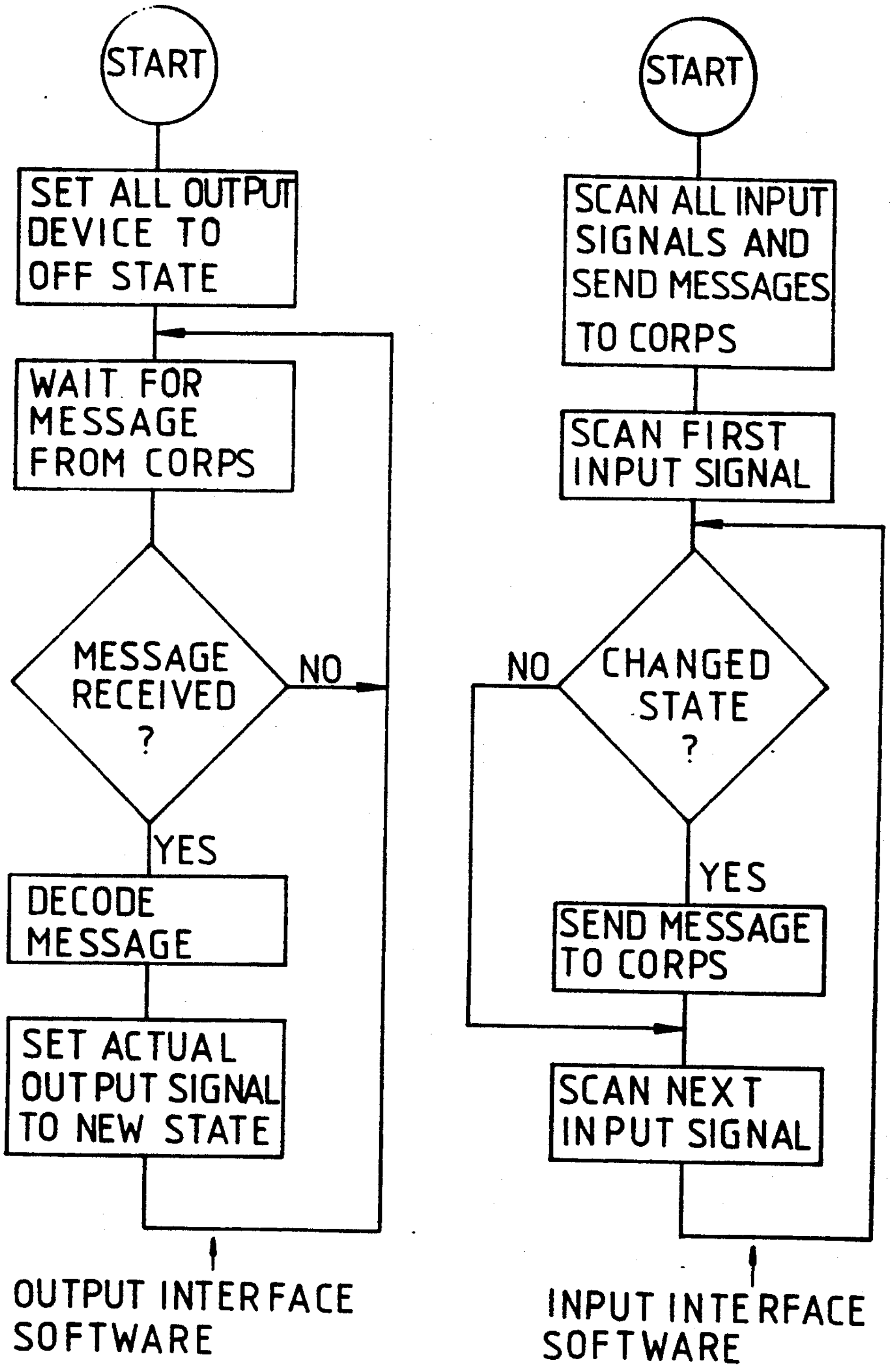

COMBINED ALARM, SECURITY AND RESCUE SYSTEM

This application is a continuation in part application of Ser. No. 07/267,119 filed Oct. 26, 1988, now abandoned.

This invention relates to a combined alarm, security and rescue system, particularly for use in high buildings and the like.

BACKGROUND OF THE INVENTION

Security systems are known for use on the outbreak of fire, on the occurrence of extreme smoke development, on break-in attempts and in various other situations. In many cases, the known systems have employed, for example, manually releasable detectors or detectors which are released by automatic sensing of movement, smoke development, heat development, and the like. The detectors can for their part release on actuation light and/or sound alarms locally and/or at more remotely disposed locations, or they can emit another signal to a central control or signal for the release of sprinkler devices or the like. Such known systems have, however, been burdened with certain deficiencies and have in many instances been found to be inadequate, especially when concerned with saving human lives under difficult conditions.

Especially in connection with high buildings and particularly in upper and central regions of high buildings, but also in other connections, difficult conditions can arise, for example by a combination of the development of heavy smoke, lack of light on power failures and blocked escape routes. It has been found, especially in connection with hotel fires, that smoke poisoning has been a significant cause of death. In spite of the extensive use of supposedly safe warning and rescue systems, there have occurred quite recently a number of deaths, which probably could have been avoided by the use of better suited equipment and a better system.

Under special conditions, for example on board offshore installations, it is usual that brochures are available in all rooms/cabins on how the security system functions together with how the user of the room and the room guest shall conduct themselves when necessary to put into use a breathing mask or other equipment for example, stored in a room box. In addition, there is present on each breathing mask proper use instructions for the mask. On the inside of the room box which includes such equipment there are found instructions-/use instructions in self-lighting (fluorescent) script. Under such special conditions, there is a possibility of keeping such a security system in order, but one has no complete guarantee that the equipment is in position and is ready for use on each occasion. Under certain conditions one can risk that the equipment is stolen, destroyed or is handled in another way in an undesirable manner, so that the equipment is unavailable in a catastrophic situation. In all instances one does not have an adequate general view or control over each individual breathing mask for every occasion.

In practice, it is also difficult in connection with a current rescue operation, in a catastrophic situation or at the beginning of such a situation, to maintain a general view and control- over where each individual user of the room is located in the current case, that is whether those present are in place in the room or are located at another spot or whether the various rooms are wholly in use. During a rescue operation, there is a need to have the best possible general view in advance, that is prior to carrying out the rescue operation, both as to which rooms contain users and/or guests and as to the condition of the equipment which is to be found in the relevant rooms.

Accordingly, it is an object of the invention to provide a system that can enable a central operator to continuously monitor the presence and condition of safety equipment (like breathing masks) contained in room boxes in separate rooms of a building.

It is another object of the invention to be able to immediately detect missing or damaged safety equipment in a room and to provide for immediate replacement. In case of an emergency situation, one can therefore be sure that the safety equipment is available for the persons in the room, and that the equipment can be used by the persons in order to avoid smoke poisoning when they are moving within smoke filled areas.

It is another object of the invention, in case of an emergency situation, to enable a central operator to give alarms and messages directly to each room or to groups of rooms, and to receive acknowledgements from the persons in the rooms, and thus reduce the risk for panic and enlarge the possibility of carrying out an effective rescue operation.

It is another object of the invention, in case of an emergency situation, to give rescue crew a real time instant survey of the situation, and information about the presence and the condition of persons in the various rooms, and thus act as a decision tool for the rescue leader.

It is another object of the invention, at any time, and especially after a disaster, to provide a chronologic list of the recorded events, thus providing information that can help investigators to reconstruct the progress of the disaster afterwards.

System Description

The present invention finds application in many different areas where a number of people have permanent or occasional residence, especially in connection with overnight stays. The system according to the invention can be used in hotels, hospitals, cruise vessels, offshore living quarter platforms and other places where many people usually are gathered within a definite area. The system includes room boxes distributed in actual rooms or cabins, a central operator station, hereafter called "COPS," located at a central location of the actual building or vessel, for example in the reception of a hotel, and a two-way communication system for transferring information between the room boxes and the COPS.

Room Boxes

The room box is principally an arrangement that fits in with the fixtures in a hotel room or a cabin, and has the shape of a cupboard (box), drawer or similar cubicle. The room box has a chamber for storing safety equipment and a door or similar opening that is normally closed, and must be opened in order to gain access to the safety equipment. It is preferred that the door is sealed by a special sealing tape or a similar device, to prevent guests and other persons from opening the door unnecessarily because of curiosity. The room box also contains electronics like microswitches, light and sound emitters, lamp indicators, and interface circuits to the two-way communication system. The room box can also be equipped with a battery that enables the box to work even if the main power is lost.

Microswitches or similar devices in the room box are mounted in such a way that as to be closed when the room box door is closed, and open when the door is open. By electronically monitoring the state of the door microswitches, one can at the COPS continuously monitor the state of the door in each room box. Other microswitches in the room box may be controlled by sensors for heat, smoke, movement and other sensors usually used in alarm systems.

The system will be especially effective if the room box has a slot intended, for example, for a key to a hotel room, and one of the microswitches in the room box is mounted in such a way that the microswitch will be in the open state when no key is present in the key holder slot, and closed when the key is present in the key holder slot. The state of this microswitch can, by a relay coupling, control the main switch of the hotel room, so that no lights and no other electrical facilities can operate if the key is not present in the key holder slot. In addition, a buzzer or summer in the room box can be controlled by the state of the same microswitch, so that a disturbing sound will be emitted when the key is not present in the key holder slot. This will force the guest to put his key in the key holder slot in order to silence the buzzer or summer, and to make the electrical facilities work. By electronically monitoring the state of the microswitch mounted in the key holder slot, information about which rooms are occupied by guests will be available at the COPS.

The indication lamps on the room box can be controlled from the COPS, and can be marked with text as "STAY IN ROOM", "GO TO EXIT", "GO TO THE LEFT", "GO TO THE RIGHT" and other messages for the persons present in the rooms.

The room boxes also comprise a bright lamp that can be controlled from the COPS. This lamp acts as an emergency light to prevent the persons in the room from sitting in complete darkness in case of a main power breakdown.

One embodiment of the room box especially intended for crews in cruise vessels and offshore platforms, has a dedicated pushbutton that acts as an alarm actuator. The state of this pushbutton can be monitored in the same way as the microswitches. It is used by the crew to indicate to the central operator that an alarm situation has arisen, and that assistance is needed at the location of the actual room box. It can also be used as a receipt button.

Instead of microswitches, other electronic sensors can be used, for example inductive or capacitive sensors.

Central Operator Station

A data control 10 consists basically of a data processing unit with a visual display unit—hereafter called VDU—, pushbuttons that can be activated by the operator, a printer and an interface to the two-way communication system. The data processing unit comprises a microprocessor, a real time clock, data memory and a program memory. The data processing unit which functions as a central operator station (COPS) can also have an uninterruptable power supply that enables the station to work even if the main power is lost.

The COPS has a menu driven operator interface. When the system is powered up, a main menu is shown at the VDU, and the operator can choose between several functions by pressing one of the function pushbuttons. Some of the functions will display sub-menus with new choices for the operator, other functions will display floor plans indicating room locations and the state of each input device in the room boxes. The system can also display the location and the state of additional detectors as smoke, heat and movement detectors. The display can also show the location and the state, open/-closed, of the fire doors in a building.

All information displayed at the VDU can be printed out at any time by pressing a dedicated pushbutton on the COPS. Additional information, for example a list of recorded events, can also be printed out on the printer by pressing dedicated pushbuttons on the COPS.

Two-Way Communication System

The two way communication system provides a connection between the COPS and each of the electronic input/output devices in each room box, like microswitches and sound emitters. There are several ways of establishing such a connection. The connection can be carried out by a point-to-point cable connection between each input-output device in the room boxes and intelligent input/output interface cards placed near the COPS, with a duplex serial communication link between the interface cards and the COPS. In this case, the signals transferred on the serial link from the interface cards to the COPS are coded signals that contains information about the individual state of the microswitches in each room box. Similarly, the signals transferred from the COPS to the interface cards are coded signals that contain information used by the interface card to individually control each of the output devices in each room box.

An alternative way of establishing the connection between the COPS and each input and output device in the room boxes, is to provide the room box with an intelligent input-/output card, and let each such card communicate with the COPS via a duplex, serial communication link.

A third alternative is to make a point-to-point connection between the input-/output devices of each room box in one floor and intelligent input-/output cards in each floor and let these cards communicate with the COPS as mentioned above. The communication medium can be electrical twisted pair cables, coaxial cables, fiber optic cables or wireless. Each type of medium requires a dedicated interface or modem both in the room boxes and at the COPS. A preferred solution is the use of a coaxial broadband cable, in which other signals can be transferred simultaneously, for example TV or video signals.

In any case the cables should be flame resistant. The two way communication system's interface cards continuously monitor the state of all microswtiches and other input-devices in the room boxes, and send a coded message to the COPS every time a card detects a change of state. The coded message contains information about the new state and the identity of the input device which has changed state. The software in the COPS will record the arrival of such a message together with the time of arrival, which is derived from the real time clock in the COPS. The recording is done in a part of the data memory which is non-volatile, i.e. on a hard disk. From data tables in the data memory, information about the location of the actual input device is fetched, and the change of state is displayed at the VDU as a change of colour of crosshatching in the floor plans displayed at the VDU. This will be described in detail later.

The two way communication system's interface cards also continuously wait for coded messages from the COPS, and at the arrival of such a message sets one or more output devices in the room boxes to a new state. This is used to switch lamp indicators or sound emitters in the room boxes on or off. The emission of a coded message from the COPS is controlled by the software in the COPS, and initiated by the operator when he activates one of the pushbuttons at the COPS. The emission of coded messages from the COPS is time-stamped and recorded in the non-volatile part of the data memory of the COPS in the same way as the arrival of coded messages from the interface cards. The system described above can be utilized for controlling that the safety equipment in the room boxes are always present and intact. Every opening of a room box door will immediately be detected at the COPS, and service personnel can inspect the actual room and replace equipment that is stolen or tempered with.

If a fire should break out, or a similar emergency situation should arise, the system can be used to warn all persons present in the rooms of interest. By pressing dedicated pushbuttons at the COPS, the central operator can effect that sound producers like sirens are activated in the room boxes, at the same time as the emergency light and the lamp indicating STAY IN ROOM is lighted. The guest is then assumed to open the room box door and take out the breathing mask and other safety equipment in the room box. The COPS will detect that the door is opened, and this will be indicated at the VDU.

By this, the rescue crew will known that the people in the actual room have reacted to the alarm, and for example concentrate on the rooms where people are present without having opened the room box door.

When the rescue team is ready to evacuate a sector the central operator issues the message GO TO EXIT to the rooms of interest by pressing a dedicated pushbutton on the COPS. The corresponding indication lamps on the actual room boxes will be lighted, and all of the persons present in the actual sector can be evacuated simultaneously.

These and other objects advantages of the invention will be more apparent from the following detailed description taken in conjunction with the accompanying drawings in which, FIG. 1 shows the system according to the invention in a block diagram;

FIG. 2 shows schematically a input interface card in accordance with the invention;

FIG. 3 shows schematically a output interface card in accordance with the invention;

FIG. 4 shows a junction box to which there are connected the different rooms in a floor of a building;

Figure 5:
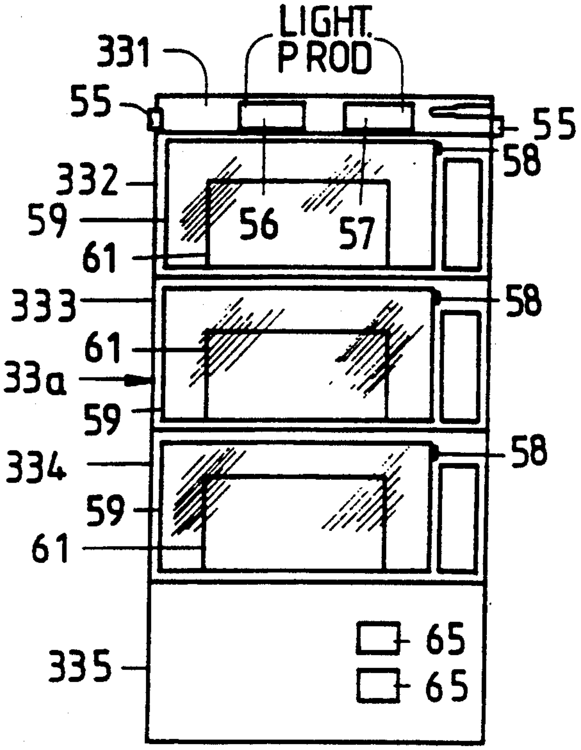
Figure 6:
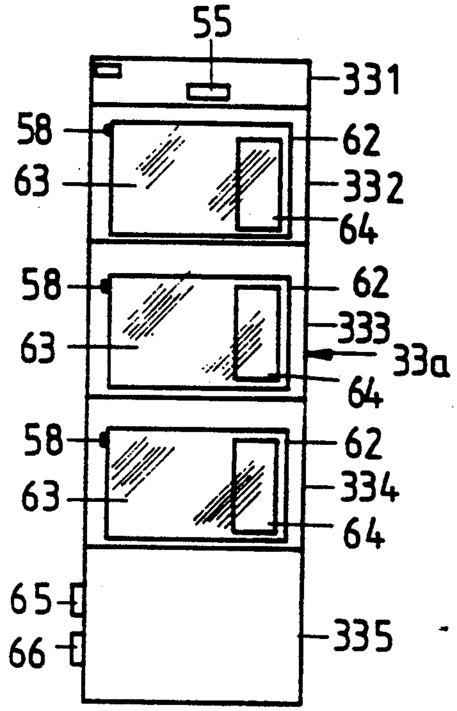
Figure 7:
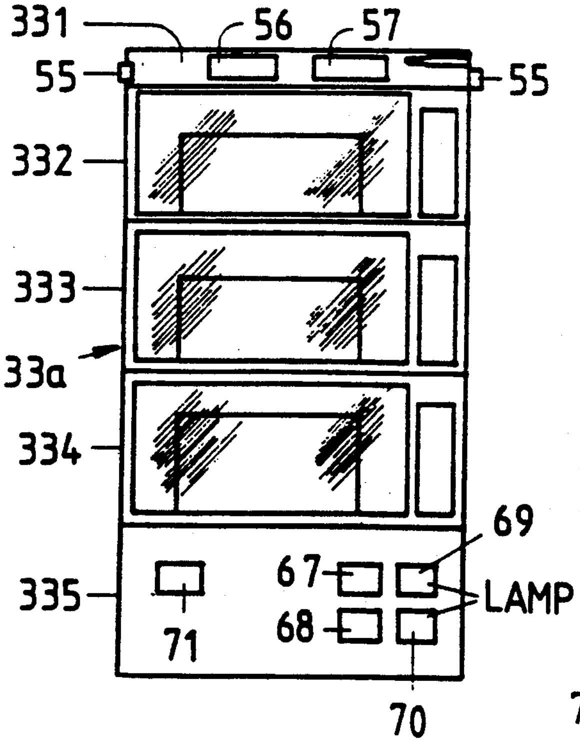
Figure 8:
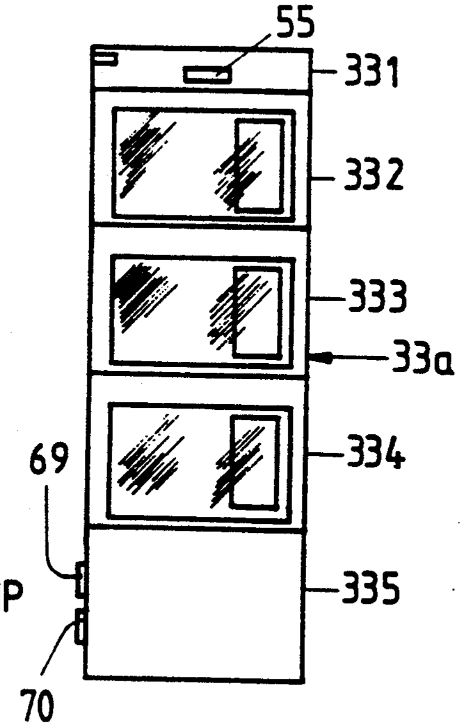
Figure 9:
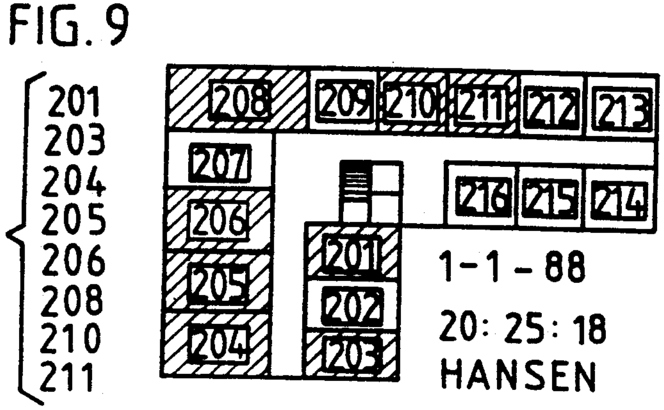
Figure 10:
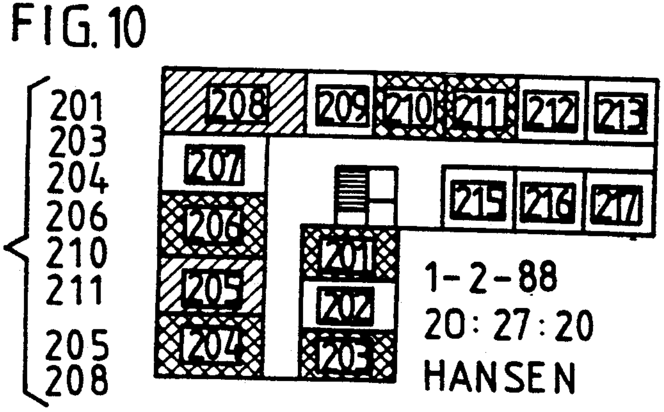
Figure 11:
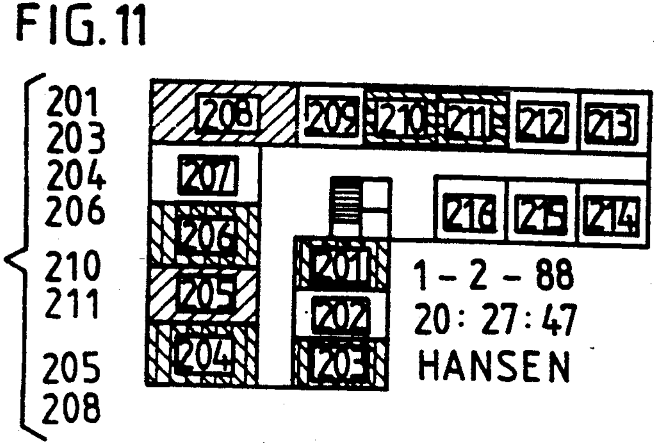

FIG. 4*a* shows an embodiment of the electronics in an unintelligent room box;

FIGS. 5 and 6 show the front and the one side of a room box according to a first embodiment of the invention for use, for example, in a hotel;

FIGS. 7 and 8 shows the front and the one side of a room box according to a second embodiment of the invention for use, for example, in a cabin of a dwelling platform of an offshore installation;

FIG. 9 illustrates a floor plan of a hotel on a screen display of the VDU of the COPS to indicate which rooms are occupied;

FIG. 10 illustrates a floor plan of the hotel similar to FIG. 9 which indicates rooms in which a room box door has been opened;

FIG. 11 illustrates a floor plan similar to FIG. 9 which indicates the rooms to which messages have been directed in accordance with the invention;

FIG. 12 shows a block diagram of an embodiment of the system in accordance with the invention with intelligent room boxes and broadband communication link between the COPS and the room boxes;

FIG. 13 shows the details of an intelligent embodiment of the room box in accordance with the invention; and FIG. 14 shows a flow diagram of the software in the intelligent room boxes, or the input and output interface cards in accordance with the invention.

The software in the COPS is not described by flow diagrams, as the written description of the system will also be a description of the software in the COPS.

Detailed Description

In the following description there will be illustrated some typical areas of use.

Figure 1:
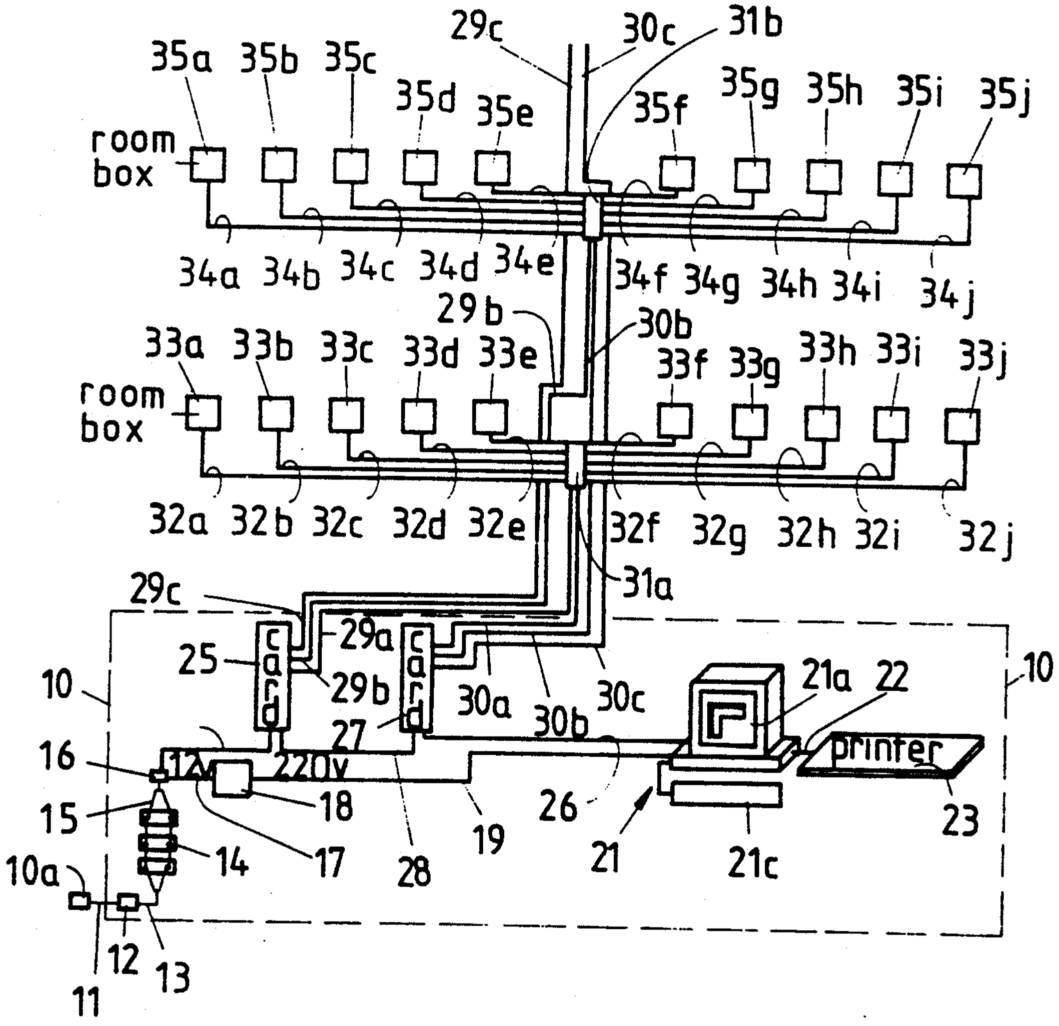

Referring to FIG. 1, the system is employed, for example, in a hotel and includes a data central 10 with battery backup and two interface cards 25, 27 to the two-way communication system. There is shown a coupling point 10*a* for 120 V/230 V mains voltage with a wire connection 11 to a battery charger or AC/DC converter 12, whose output terminals are connected via wires 13 to a rechargeable 12 V NiCad battery 14. The battery terminals are connected via cables 15 and 17 with fuses 16 to a DC/AC converter 18 which delivers 120 V or 230 V at its outputs. The outputs of this converter 18 is connected via a cable 19 to the COPS 21 and the printer 23. The COPS is here an ordinary PC with color VDU 21*a* and keyboard 21C. Cable 22 connects the printer 23 to the printer port of the PC.

Cables 24 and 28 feeds the interface cards 25 and 27 with 12 V DC power. Cables 26 and 28 provide the necessary connections for transferring coded signals between the interface cards 25 and 27 and the serial port of the PC.

The interface card 25 is an output interface card which receives coded signals from the serial port of the PC and controls a number of output signals, each signal being connected with one output device in one of the room boxes 33*a*–33*j*, 35*a*–35*j*, for example a sound emitting device or an indicator lamp.

The interface card 27 is an input interface card which is connected with the input devices in the room boxes, and monitors the state of the input devices. If a change of state is detected, the interface card 27 will send a coded signal to the serial port of the PC, indicating the identity of the input device and the new state of the device.

The coded signals can be formatted in different ways, one example is RS232 standard signals with a standard communication protocol embedded in the software of the PC and the interface cards, for example HDLC or BISYNCH.

Several multiwire cables 29*a*–29*c*, 30*a*–30*c* extend from the interface cards 25, 27 to respective junction boxes 31*a*, 31*b*, etc. located one on each floor. In the illustrated embodiment, there are only shown three input-cables and three output-cables to three floors, while in practice there can be arranged a larger number of floors and a corresponding larger number of cables and junction boxes.

From the junction box 31*a*, there pass separate multiwire cables 32*a*–32*j* to respective room boxes 33*a*–33*j*. In the same way, separate multiwire cables 34*a*–34*j* pass from the junction box 31*b* to room boxes 35*a*–35*j* in the floor above. Each wire in the multiwire cables 32*a*–32*j*, 34*a*–34*j* is connected to one single input or output device in the room boxes, as illustrated in FIG. 4*a*.

FIG. 2 illustrates the input interface card 27. The input signals from cables 30*a*–30*c* are connected to terminal bar 37. From the terminal bar 37, printed wires are connected to a number of input buffers, 401, 402. The number of input buffers depends on the total number of input devices in the room boxes, here are shown only two input buffers. The outputs of the input buffers 401, 402 are connected via a module bus 404 to a microcontroller 36, which can be, for example, an Intel 8752 or similar type. The output ports of the input buffers 401, 402 are controlled by chip select signals from an address decoder 403.

The 12 V power for the interface card 27 is fed from the cable 28 and connected to a termination bar 38, together with the serial communication signals in cables 26 and 28. These signals are connected to the microcontroller 36 via printed circuits 405. The 12 V signal is fed from the termination bar 38 into a 5 V regulator 41 and distributed throughout the card 27.

In FIG. 3, there is shown the output interface card 25. The 12 V power for the interface card 25 is fed from the cable 24 and connected to a termination bar 48, in parallel with two wires of the cable 28. The 12 V signal is fed from the termination bar 48 into a 5 V regulator 409, and the 12 V and 5 V powers are distributed throughout the card 25. The serial communication signals in the cable 28 are also terminated at the bar 48, and connected via printed circuits 410 to a microcontroller 44.

The microcontroller 44 controls the state of the output signals from the card 25 by writing bit-patterns into output buffers 406, 407 via a module bus 408. The latching of bit-patterns into the output buffers are controlled by latch signals 411, 412 from an address decoder 413. The number of output buffers is dependent on the total number of output devices in the room boxes, only two are shown.

Each output signal from the output buffers 406, 407 controls the state of a relay, 45*a*, 45*b*. When the relays are closed, 12 V is fed through fuses 46*a*, 46*b* via a termination bar 47 to a respective wire in the multiwire cables 29*a*, 29*b*. Instead of relays, optocouplers can be used. At least one of the wires in the multiwire cables 29*a*–29*c* is connected to ground, and at least one wire is connected to 12 V. For clarity, only one output signal from the output buffers is shown, normally an output buffer will have 8 output signals.

Referring to FIG. 4, each junction box 31*a* contains four coupling bars 51, 52, 53 and 53*a*. At least one of the ground signals in the cable 29*a* is connected to the common ground bar 53. All of the terminals in the ground bar 53 are couple together. In the same way at least one of the 12 V signals in cable 29*a* is connected to the common 12 V bar 53*a*. All of the terminals in the 12 V bar 53*a* are coupled together.

The output signals in cable 29*a* are connected to separate terminals or points on an output bar 52. The input signals in cable 30*a* are connected to separate terminals or points on an input bar 51. The wires in the cables 29*a* and 30*a* are connected to wires in the room cables 32*a*–32*j* across the input bar 51 and the output bar 52, but only cables 32*a* and 32*b* are shown. The illustration shows that two input signals and three output signals are fed to each room, together with the ground and 12 V signals.

FIG. 4*a* illustrates an example of the electronics in a room box, i.e. a printed circuit board 414 with two microswtiches, pushbuttons or similar devices 416*a* and 416*b*, a sound emitter 418, and two lamps 419*a* and 419*b*. The wires in the cable 32*a* are connected to respective terminals 415*a*, 415*b* . . . on the terminal bar 415. The 12 V signal is fed via two resistors 417*a* and 417*b* to one terminal of the microswtiches 416*a*and 416*b*. From these terminals of the microswitches, connection is made to the two input signals in cable 32*a* via the terminals 415*a* and 415*b*. The other terminals of the microswtiches are connected to ground. When the microswtiches are open, the input signals will hold 12 V, when they are closed the input signals will hold 0 V. This is monitored in the input interface card 27, and any change of state for the microswtiches will be reported to the COPS via cable 26 (FIG. 1). All types of detectors that give an open/closed type output signal can be used instead of microswtiches. The output signals from cable 32*a* are connected to one terminal of the sound emitter and the lamps, respectively. The other terminals of these output devices are connected to ground. When the operator wants one of the lamps to light, for example, he presses a dedicated pushbutton on the COPS. The software in the COPS will send a coded signal to the output interface card 27, which in turn closes the actual relay contact, so that 12 V is fed to the actual output signal in cable 32*a*. The lamp in the room box then will have 12 V voltage applied, which makes it light. When the operator wants to turn the lamp off again, a new coded signal is sent from the COPS to the output interface card 27, which opens the actual relay contact, so that 12 V is no longer applied to the lamp via the output signal in cable 32*a*.

The number and type of input and output devices in the room box can easily be changed by expanding the terminals 415, 37, 47, 51 and 52, adding more input and output buffers in the interface cards, and using cables with more wires than indicated on the drawings.

Above is given a description of a simple embodiment of the system. A more preferable solution is to provide the room boxes with a microcontroller and interface to different communication media.

FIG. 12 illustrates an embodiment of the system that uses broadband coaxial cables or fiberoptic cables for the transfer of coded signals between the COPS and the room boxes. This is very useful in buildings where such cables already exist, for example for transmission on TV or video signals. In accordance with the system, both TV signals and coded signals between the room boxes and the COPS can exist simultaneously on the cables.

As illustrated, the data central 500 has a COPS formed of a VDU 501*a*, keyboard 501*b*, and data processing unit 501*c*, as well as a printer 502. A power cable 505 from the 120V/230 V main power inlet 506 is connected to an Uninterruptable Power Supply (UPS) 507. The UPS has a battery on the inside and can produce necessary power for the units inside the data central 500 even if the main power breaks down. The UPS feeds continuously AC power to the units inside the data central 500 via cables 508*a*–508*c*.

The printer 502 is connected to a printer port of the DPU 501*c* via a cable 503. A serial port of the DPU 501*c* is connected to a modem 509. This modem can be of Frequency Shift Keying type, and its output can be either a broadband coaxial cable connector or a fiberoptic connector, dependent on the choice of communication medium.

A coaxial cable or a fiberoptic cable 510 leads from the modem 509 to all of the room boxes 511*a*–51*d*, 512*a*–512*d*. The room boxes are connected to the cable via T-connectors 513*a*–513*h*. At suitable distances from the modem 509, repeaters 514*a*, 514*b* are inserted in the cable. This will ensure that the power of the signals in the cable will be sufficient at any connection point. The room boxes are powered by main power via the inlets 515*a*–515*h* and the power cables 516*a*–516*h*.

FIG. 13 illustrates the electronics in this embodiment of the room box. The room box 511*a* contains a printed circuit board 517 which is described in the following. The main power cable 516*a* is terminated at two terminals 518, and the power signal is connected via printed circuits to an AC/DC converter 519.

The converter has one 12 V DC output signal 519*a* and one 5 V DC output signal 519*b*. These signals are distributed throughout the board.

The board 517 is connected to the coaxial or fiberoptic connection point 513*a* via a short cable 520 of the same type and a connector 520*a*. From this connector, the signal is fed to an FSK modem 521, which is directly connected with a serial port of a microcontroller 522. The microcontroller 522, can, via a module bus 523, write bit-patterns to an output-buffer 524, which in turn controls the state of output devices 525*a*–525*c*. The microcontroller 522 can also read the state of input devices 526*a*, 526*b* via an input buffer 527 and the module bus 523. The buffers are controlled by signals from the address decoder 528.

The software in this embodiment of the room box is similar to the software in the interface cards of the simple embodiment of the system described above. FIG. 14 shows a flow diagram of the software in the interface cards and the intelligent embodiment of the room box.

If desired, an embodiment with wireless transceivers can be used instead of broadband cables and modems. The transceivers are put in the place of the modems of FIG. 12 and FIG. 13. The transmission is started automatically when an outgoing coded signal is received via the connection to the serial port of the microcontrollers in the room boxes, or via the connection to the serial port of the COPS. Opposite, when a message is received by air, a coded signal is automatically sent to the serial port of the microcontroller in the room boxes, or to the serial port of the COPS. This embodiment will not be described in further details.

In FIG. 5 and 6, there is shown an example of a room box 33*a* which is designed for use in a hotel room and more specifically for use in a double room, that is for example for use for two lodging guests and a third casually visiting guest. The room box consists of five units 331, 332, 333, 334, and 335 placed together. The uppermost unit 331 includes a pair of sound producers 55, two light producers 56, 57 (for example with red and green lights) and a set of microswitches 58. The next three units 332, 333, and 334 include their respective front doors 59 with their respective microswitches 58. The door 59 provides access to a chamber 60 which can include a breathing mask 61. Correspondingly a side door 62, the opening of which is monitored by its respective microswitch 58, provides access to a chamber 63 which includes its respective flashlight 64. Each of the three guests consequently have access to their respective breathing masks and their respective flashlights. The fifth, lowermost unit 335 includes diverse electronic equipment, for example battery, modem, microprocessor and input-and output buffers (not shown further). On said lowermost unit there is present a first indicating lamp 65, which when activated provides for example an instruction "GO TO EXIT", and a second indicating lamp 66, which when activated provides for example an instruction "REMAIN IN THE ROOM".

At the start of a warning situation, a primary sound and light signal can be emitted via the sound producer 55 and the light producers 56, 57 on the upper unit 331 of the room box 33*a*. The one light producer 56 can for example emit a flashing light signal, while the other light producer 57 can for example indicate a particular instruction, such as fetching out of the box and putting into use breathing masks, flashlight etc.

Once the door 59 or 62 of the room box is opened, a microswitch will change state. This will be indicated at the COPS that the door is opened. Consequently, it will be indicated that the actual guests a) are present and b) have been warned and c) presumably have followed the instruction. The central operator has thereby received a confirmation that the conditions a–c are under control in the actual room.

Later, there can be issued one after the other further instruction from the COPS as required, via the indications lamps 56 and 57. If necessary, an additional pushbutton (not shown) can be present on the room box, which can be used by the guests to confirm the reception of every new instruction that is issued from the COPS and presented to the guests by the indication lamps on the room box being illuminated. In this way, continuous contact between the guests in the actual hotel rooms and the central operator can be maintained, even if other communication lines should be broken.

FIGS. 7 and 8, show a room box 33*a'* which is designed for use in a bedroom or living room for the crew on board a residential platform, on board a boat or in another connection, for example for service personnel at a hotel. There is illustrated a room box corresponding essentially to the room box as shown in FIG. 5 and 6, with the only difference that the lowermost unit is provided with four alarm indicating lamps 67–70 and an alarm receipt 71. The four lamps 67–70 can indicate various instructions, for example that the occupants shall "REMAIN IN THE ROOM", or "GO TO MEETING PLACE" or "GO TO RESCUE LOCATION" or "EXIT THE ROOM IMMEDIATELY" etc. This different instruction can be issued from the COPS, and the instruction can be acknowledged by pressing the receipt button. The room boxes 33*a'* can if desired be employed in the same system as the room boxes 33*a* according to FIG. 5 and 6.

The information about the presence and condition of the guests in various rooms, that is displayed at the VDU in the COPS, is valuable in several connections. In particular, it is important for rescue crews who are to assist guests and other persons in a rescue situation and for fire crews and others who are involved in the rescue operations. In addition to the COPS in the reception area of a hotel, there can be present a more remote parallel operator station at a fire station, at a police station or in a security center.

In FIG. 9-11 are shown examples of screen displays at the VDU. The figures illustrates how the collected information from the room boxes is displayed at several phases of an emergency situation. The displays shows a floor plan of a hotel, with 16 rooms on one floor numbered from "201" to "216". Similar floor plans for each floor can be established.

The displayed information can, at any time, be printed out on the printer together with the time and date for the printout. In FIG. 9, some of the rooms are filled with a first cross-hatching, indicating that guests are present in these rooms. The presence of guests have been detected by the data processing unit of the COPS because the guests have put their room key into the key holder slot of the room box. A list of the occupied rooms is shown at the left side of FIG. 9, in the column marked A.

Suppose an emergency situation arises. The central operator issues a warning to all of the rooms displayed at the VDU. The guests in the rooms are supposed to open the room box and take out the personal safety equipment contained in the room box. When the room box door is opened, the data processing unit of the COPS receives coded signals indicating which room boxes have been opened. Those rooms where the room box is opened will then be indicated with a second crosshatching, deviating from the first crosshatching as shown in FIG. 10. In column B at the left side of FIG. 10 is listed the rooms where the room box door is opened. In column C to the left of FIG. 10 are listed two rooms where guests are registered, without having opened the room box. The reason why the guests in these rooms have not opened the room box can be that they are unconscious for some reason, for example smoke poisoning, and these rooms should be subject to special attention during a rescue operation.

If desired, a continuous warning can be effected both to the rooms listed in column C and those rooms that are indicated as empty, that is those rooms with no crosshatching on the display.

In FIG. 11, the message STAY IN ROOM has been sent from the COPS to the rooms listed in column D and marked with vertical lines on the display. The message GO TO MEETING PLACE has been sent to the rooms listed in column E and marked with horizontal lines on the display. The third column C to the left of FIG. 11 is still under attention for possible further investigation. Correspondingly, there can be indicated on the VDU with different crosshatching or different colors, or in another suitable manner, different status for the various rooms individually.

It is consequently possible to obtain a real time, continuously updated, survey over the floors and each single room separately at the VDU in the COPS, as well as at operator stations by the fire department and/or police or another security center. Further, it is possible to issue warnings, alarms and messages to individual rooms or groups of rooms in preferential succession as required gradually as the conditions develop.

The described system thus, first and foremost, has significance in connection with signs of fire and then, first and foremost, as a two-way communication system for issuing simple and concise instructions and messages together with alarms, and the return of acknowledgment from the guests. In the COPS, the instructions and the messages can be recorded separately, but can for example be indicated together on the VDU in a floor chart or similar survey chart, or be printed out on a printer.

By employing each individual room box as storage boxes for diverse safety equipment, such as breathing masks and flashlights, and in this connection combining withdrawal of such safety equipment with an emission of a signal, which is released by microswitch on opening the door to appropriate storage boxes, there is the possibility of achieving ready and rapid two-way communication between the central operator and the guests in individual rooms. By means of the charted survey, there is the possibility of obtaining effective insight into approaching the problem for each individual room and for each individual floor based on the information displayed on the VDU gradually as the room boxes are opened.

With the intention of increasing the efficiency of the course of rescue in each single floor, there is also the possibility of effecting other operations, such as automatic opening of a lock to each and all rooms of the floor by remote control from the COPS, by letting a dedicated output device in the room box control the door lock of the individual room. In this way, the rescue crew can after the doors are opened to the different rooms, readily clear access to each individual room or if desired set up alternative escape routes via one or more rooms, as required.

In addition to the afore-mentioned system, diverse other functions can be utilized in and at the hotel room. For example, the microswitch in the door lock can be used for warning of the opening and closing of the door. A second microswitch can be arranged in association with a main switch (for light, radio, TV, etc) which is actuated by the same key as the door key, as described before. If intruders lock themselves into the room when the key is in position in the key holder slot in the room box, there can be emitted signals to the COPS and subsequently form the COPS to sound emitters in the room box. It is also possible to perform other monitoring operations (warning of the appearance of water, smoke or heat, overseeing paintings, safe, windows or other things) for warnings via the room box to the COPS or via the room box to separate warning arrangements in the room in question.

In addition to warning arrangements which can ensure the general safety of the guest in a stay at a hotel, the system can be utilized for monitoring ordinary things, such as consumption from the bar cabinet and the use of pay TV program, and the like. Correspondingly, the system can be used by service personnal for indicating at the COPS for example the starting and finishing of cleaning and clearance of the individual rooms for new guests.

According to the invention, a communication system can be established which can daily have great significance in a hotel reception or similar security room, in order to provide complete and accurate overseeing of each individual room as part of the daily routines. For example use of the bar cabinet, use of the telephone, use of TV/video or other similar services can be recorded. Control of the presence of guest/guests in the individual room, including the time of arrival in the room and departure from the room of the guest/guests. Control of cleaning, clearing and making ready of rooms by registration from room service, etc.

In addition to this routing overseeing of normal and conventional functions in a hotel, such as mentioned above, one has the possibility of ensuring a special security of each individual room separately with the intention of warning of water damage, warning of the signs of fire (heat and smoke development), warning of break-ins, warning of the theft of paintings and general warning of acute, spontaneously occurring things in the individual room. In connection with such warnings, there can be established in addition a general, two-way communication system between the central operator and the guests outside the usual communication systems, such as telephone connection. By means of a simple signal system with coded signals, there can be achieved ready monitoring at the COPS and ready instructions in the individual room. By the fact that one uses the system daily for the remaining trivial and normal functions and simultaneously for security systems, alarm systems and rescue systems (monitored, sealed containers for breathing masks and the like), there is the possibility of maintaining continuous, effective control over individual components of the system, so that these (especially breathing masks and the like) can be expected to function completely satisfactorily in an acute crisis situation.

By means of the input buffers and the microcontroller 36 on the interface card 27, a couple of thousand room boxes *33a*–*33j*, *35a*–*35j*, etc. can be monitored at the same time. Immediately the door on a room box is opened (out of curiosity or for another reason), this is notified to the COPS and becomes recorded at the COPS both in the data memory, on the VDU and at the printer. Other overseen functions will be correspondingly recorded and the sum of all registered information can be displayed in a common data screen chart, which can have particular value in connection with a rescue action in a catastrophic situation.

By reserving some terminals in the input and output-bars in the junction boxes 31*a*, 31*b* for special connection to portable equipment, it is possible to achieve communication between the junction boxes and the COPS, and between the junction boxes and room boxes connected to the junction box. This can be used by rescue personnel carrying portable equipment to communicate with both the central operator and the guests in the actual rooms.

A particular advantage is that the communication system can be utilized in an economically favorable manner in connection with conventional wiring for TV/video transmission systems, that is to say based on the same coaxial broad band cable and associated equipment which is used for TV/video transmission, but with extra modems in each room box and at the COPS, and into intermediate stations for example in the different junction boxes.

The system according to the invention can be connected by relatively simple means to existing coaxial cable lines for TV transmission or video transmission internally in a hotel or to another coaxial cable line which is employed for other purposes in connection with hospitals or similar institutions. Thus, there can be effected a common, daily overseeing of the TV/video system or similar known internal communication system and the system according to the invention with connected functions.

What is claimed is:

1. A combined alarm, security and rescue system comprising a plurality of room boxes, each room box having a chamber for storing safety equipment, a door for providing access to said chamber, at least one microswitch for activation on opening of said door and at least one output device for indicating an alarm; and a central operator station connected to each said room box, said station including a data processing unit, an output interface card connected between said data processing unit and said output device of each room box for selectively emitting a signal thereto from said data processing unit for actuation of said respective output device, and an input interface card connected between said data processing unit and said microswitch of each room box for receiving a signal from each microswitch indicative of opening of a respective door and for transferring a signal to said data processing unit indicative of the identity and state of said activated microswitch.

2. A system as set forth in claim 1 wherein said central operator station includes a visual display unit for visually displaying the state of each room box simultaneously.

3. A system as set forth in claim 2 wherein said station includes a printer for printing information regarding the time of receipt of a signal from said input interface card, and the nature of said signal.

4. A system as set forth in claim 1 wherein each room box has a plurality of output devices for visually displaying messages, each said output device being connected to said output card to receive a signal therefrom for selective activation thereof.

5. A combined alarm, security and rescue system for a multi-room complex comprising a plurality of alarm producers, each producer being disposed in a respective room to emit a warning signal in response to activation thereof;

an output interface card electronically connected with said alarm producers to emit a signal to selected producers for activation thereof;

a plurality of room boxes, each box being disposed in a respective room of the complex and including a chamber to contain safety equipment, a door providing access to said chamber and a microswitch for emitting a coded signal in response to opening of said door, said signal being indicative of the location of the respective room;

an input interface card electronically connected to said room boxes for receiving said coded signals from said room boxes;

a microprocessor connected to said input card for evaluating said received coded signals; and a data screen for visually displaying information corresponding to said evaluated signals.

6. A system as set forth in claim 5 wherein said cards, said microprocessor and said data screen are disposed in a remote data exchange.

7. A combined alarm, security and rescue system for a multi-room complex comprising a plurality of room boxes, each box being disposed in a respective room of the complex and including a chamber to contain safety equipment, a door providing access to said chamber and a microswitch for emitting a coded signal in response to opening of said door, said signal being indicative of the location of the respective room;

a plurality of alarm producers, each alarm producer being disposed in a respective room of the complex; and a data exchange having an output interface card for emitting a signal to selected alarm producers for activation of an alarm in a respective room, an input interface card for receiving said coded signals room said room boxes, a microprocessor connected to said input card to evaluate said received coded signals, a data screen for visually displaying information corresponding to said evaluated signals and a printer for printing the information displayed on said screen.

8. A system as set forth in claim 7 wherein each room box has a plurality of output devices for visually displaying messages, each said output device being connected to said output card to receive signal therefrom for selective activation thereof.

9. A combined alarm, security and rescue system for a multi-room complex comprising a plurality of room boxes, each room box having a chamber for storing equipment, a door for providing access to said chamber, at least one microswitch for activation of a person-to-person communication between an operator at a central operator-activated station and a person in a respective room on opening of said door and at least one output device for indicating an alarm; and a central operator-activated station connected to each said room box, said station including a data process unit, an input interface card connected between said data processing unit and said microswitch of each room box for receiving a signal from each microswitch indicative of opening of a respective door and for transferring a signal to said data processing unit indicative of the identity and state of said activated microswitch and an output interface card connected between said data processing unit and said output device of each room box for selectively emitting a signal thereto from said data processing unit for actuation of said respective output device.

10. A system as set forth in claim 9 wherein said central station includes a visual display unit for visually displaying the state of said microswitch of each room box simultaneously.

11. A system as set forth in claim 10 wherein said station includes a printer for printing information regarding the time of receipt of a signal from said input interface card, and the nature of said signal.

12. A system as set forth in claim 9 wherein each room box has a plurality of output devices for visually displaying messages, each said output device being connected to said output interface card to receive a signal therefrom for selective activation thereof.

* * * * *